Sept. 5, 1933.     R. GUILMETTE     1,925,960
EYEGLASSES
Filed Sept. 14, 1931
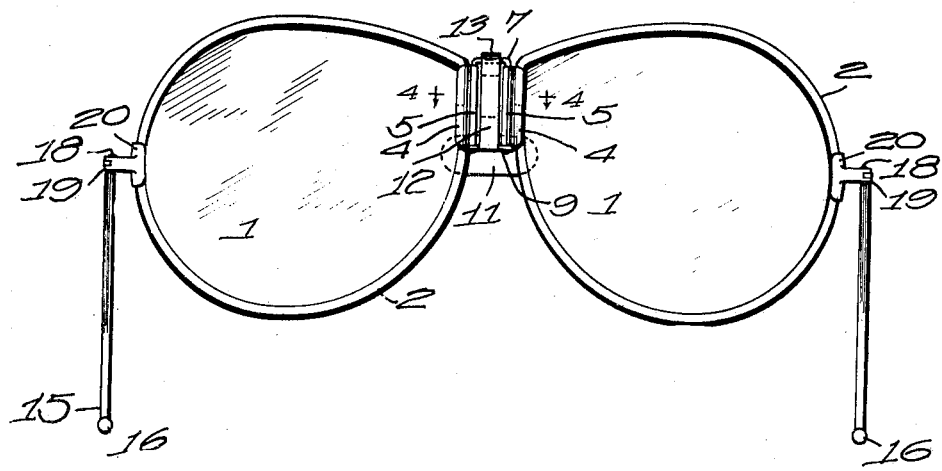
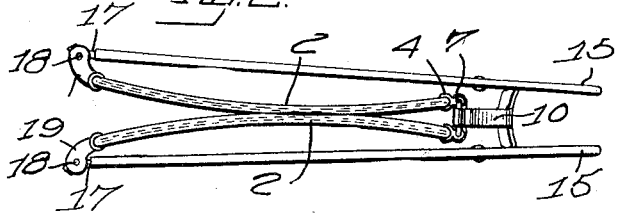
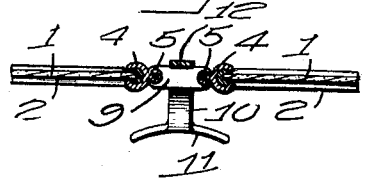
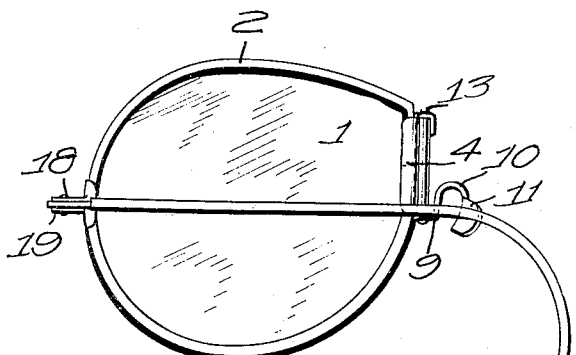
Inventor
Renaldo Guilmette
Attorney Patented Sept. 5, 1933

1,925,960

UNITED STATES PATENT OFFICE 1,925,960

EYEGLASSES

Renaldo Guilmette, Southbridge, Mass., assignor to Du Paul Central Optical Company, Southbridge, Mass., a corporation of New York Application September 14, 1931
Serial No. 562,786

2 Claims. (Cl. 88—41)

My invention relates to improvements in eyeglasses, and the improvements are particularly designed for use in connection with the type of eyeglasses known as goggles, sun-glasses, sport glasses, shooting glasses, and other glasses in this general line, although the improvements are not necessarily limited in their use.

One object of my invention is the provision of eyeglasses which will be light in weight, ornamental and attractive in appearance, easy and comfortable to wear and which will fit in proper relation to the nose and eyes to give a complete field of vision and completely protect the eyes.

Another object of my invention is the provision of eyeglasses which will be strong and durable and not likely to break in the event of falling from the face, and which can be readily adjustable to fit the wearer and insure the greatest comfort and proper relation to the eye.

Another object of my invention is the provision of eyeglasses which will be extremely simple in construction and not likely to breakage, which can be produced at the fair and proper price and which generally in every respect will prove practical, desirable and efficient.

With these objects in view, my invention consists of an eyeglass embodying novel features of construction, combinations and arrangement of parts for service substantially as shown and described and particularly defined by the claims.

In order that the detail construction and the advantages of my invention may be fully understood, and appreciated, I invite attention to the accompanying drawing, in which:

Figure 1 represents a front view of a complete eyeglass constructed in accordance with and embodying my invention.

Fig. 2 represents a top plan view with the parts in the position they occupy when the eyeglass is collapsed or folded in shape to place in the pocket with the temple bars protecting the lenses from contact.

Fig. 3 represents a side view of one of the lenses, with a temple bar folded and partly broken away to show the construction of the inner core and outer covering of the temple bar.

Fig. 4 represents a sectional view taken on line 4—4 of Fig. 1, and

Fig. 5 represents a detail perspective view of the bridge connection and nose piece which is of novel construction and a paramount feature of my invention.

In accordance with my invention, the lenses 1 are of a proper shape to cause the eyeglass to fit properly upon the face with reference to the nose and eyes, and these lenses are covered by a tubular rim or border 2, of suitable material to form an elastic bearing upon the face and at the inner restricted opposite edges of said tubular rim or border the corrugated 3, sleeves 4, clamp upon said rim or border and said clamping sleeves are formed each at their inner portion with tubular portions 5, in which is received the pair of arms 6, of the yoke-shaped member 7, which arms project beyond the lower portion of said tubular portions 5, and engage the openings 8, in the plate 9.

This plate 9 is thus located in a horizontal position and at the lower end of the lens connecting structure just described, and from one side of said horizontal plate extends the curved arm 10, which terminates in the nose piece 11, while projecting upward from the inner edge of said horizontal plate 9, is the vertical strip 12, which is provided with a bend 13, which fits upon the yoke-shaped member 7, and thus the entire structure forms the bridge connection and nose piece of my eyeglass.

From the construction described, it will be noted that the bridge structure at one side clamps firmly upon the opposing edges of the lens rim or border, and that the nose piece is disposed between the clamping elements in such a manner as to make a hinge or accommodating connection between the lenses and bridge connection to cause the eyeglasses to fit comfortably upon the nose with reference to the eyes, and to present an attractive and ornamental appearance from the front of the eyeglasses.

The temple bars of my eyeglass consist of the inner metal wire or core 14 which is enclosed by the soft envelope or covering 15, and the terminal portion is provided with a protecting cap 16, while the other terminal portion 17, is pivoted at 18 to the members 19, which are formed with corrugated clamping portions 20, which clamp upon the outer portion of the border of the lenses.

From the foregoing description, taken in connection with the drawing, the advantages of my improvements will be readily understood and appreciated, and it will be noticed that the connection between the temple bars and bridge connection is in the nature of clamps and dispenses entirely with screw or like objectionable fastenings, also that the tubular covering for the temple bars and lenses provides an elastic or soft means to insure comfort to the wearer and also to enable the bridge connection and temple bars to be easily clamped in position, also that the temple bars are capable of being folded in connection with the lenses to act as a protecting means to the lenses; also, that the eyeglasses are light in weight but very durable, also that the eyeglass structure according to my invention possesses every requirement to insure a practical, useful and desirable improvement in this class of invention.

I claim:

1. An eyeglass of the character described, comprising a pair of similar lenses, a pair of temple bars, and a hinge connection and nose piece connecting said lenses, said hinge connection comprising a pair of similar members each having a side portion to clamp upon said lenses, a contiguous vertical tubular portion, a yoke having its arms bearing in said tubular portions with their terminals projecting below said tubular portions, a member having a pair of lugs formed with openings to receive the projected terminals of said yoke, a nose engaging portion, and a bend fitting upon the closed end of said yoke.

2. An eyeglass of the character described, comprising a pair of similar lenses, a pair of similar temple bars, a rim around the edges of said lenses, a covering upon said temple bars, and a hinge connection and nose piece connecting said lenses, said hinge connection comprising a pair of similar members each having a side portion to fit upon and clamp the rims of said lenses, a contiguous vertical tubular portion, a yoke having its depending arms bearing in said tubular portions with their terminals projecting below said tubular portions, a member having a pair of lugs formed with openings to receive the projected terminals of said yoke, a nose engaging portion, and a bend on said nose engaging portion fitting upon the upper closed end of said yoke.

RENALDO GUILMETTE.